United States Patent [19]

Tochikubo

[11] Patent Number: 4,854,348
[45] Date of Patent: Aug. 8, 1989

[54] SINGLE CYLINDER TYPE SWITCHING VALVE FOR MIXING HOT AND COLD WATERS

[76] Inventor: Shigeo Tochikubo, 11-12, Noukendai 1-chome, Kanazawa-ku, Yokohama-shi, Kanagawa, Japan

[21] Appl. No.: 83,946

[22] Filed: Aug. 4, 1987

[30] Foreign Application Priority Data

Aug. 6, 1986 [JP] Japan .................................. 61-184731
Aug. 9, 1986 [JP] Japan .................................. 61-187557

[51] Int. Cl.⁴ .............................................. F16K 11/00
[52] U.S. Cl. ............................. 137/625.17; 137/636.4; 137/898
[58] Field of Search ............... 137/625.17, 636.4, 898

[56] References Cited

U.S. PATENT DOCUMENTS

| | | | |
|---|---|---|---|
| 3,456,677 | 7/1969 | Mongerson | 137/636.4 |
| 3,828,821 | 8/1974 | Dotter | 137/636.4 |
| 3,981,330 | 9/1976 | Watts | 137/636.4 |
| 4,473,088 | 9/1984 | Dotter | 137/636.4 |
| 4,522,231 | 6/1985 | Bergmann | 137/625.17 |

FOREIGN PATENT DOCUMENTS

| | | |
|---|---|---|
| 967938 | 12/1957 | Fed. Rep. of Germany . |
| 1916071 | 10/1969 | Fed. Rep. of Germany . |
| 253269 | 1/1977 | Fed. Rep. of Germany . |
| 2544256 | 4/1977 | Fed. Rep. of Germany . |
| 3530811 | 3/1987 | Fed. Rep. of Germany . |
| 654089 | 1/1986 | Switzerland . |

Primary Examiner—John Rivell
Attorney, Agent, or Firm—Browdy and Neimark

[57] ABSTRACT

There is disclosed a single cylinder type switching valve for mixing hot and cold waters for exhausting, stopping or mixing hot and cold waters to be used for a mixture cock for hot and cold waters, having inlets for hot and cold waters formed as plane seal of smooth surfaces of smooth guide sliding surface and smooth sliding surface of the switching valve inside a cylinder to eliminate O-rings to be readily damaged and to precisely finish with a material having high hardness such as special steel, stainless steel, ceramic or new ceramic material to provide excellent sealing effect in the switching valve, thereby improving enduring lifetime.

8 Claims, 13 Drawing Sheets

Fig. 4.
Fig. 5.
Fig. 6.
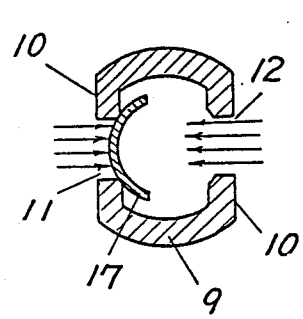
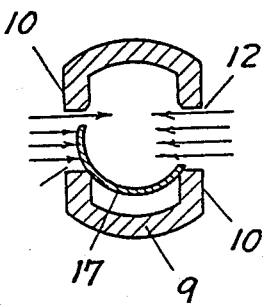
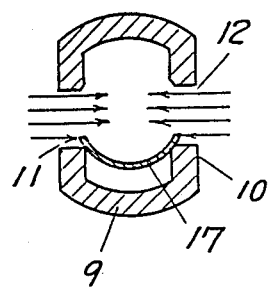
Fig. 7.
Fig. 8.
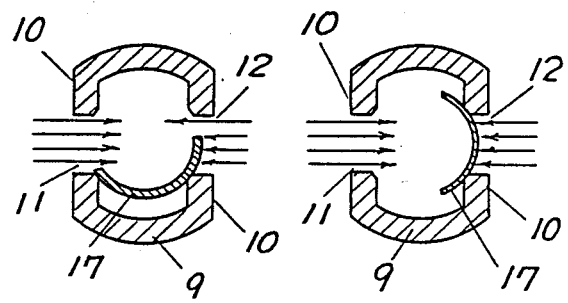

SINGLE CYLINDER TYPE SWITCHING VALVE FOR MIXING HOT AND COLD WATERS

FIELD OF THE INVENTION

The present invention relates to a single cylinder type switching valve to be ordinarily used for a mixture cock for mixing hot and cold waters for exhausting, stopping or mixing the hot and cold waters.

BACKGROUND OF THE INVENTION

A conventional single cylinder type switching valve of this type is composed in a cylindrical shape to open or close inlets for hot and cold waters and to adjust the mixture amount of the hot and cold waters in the same valve body, and operates to open or close the inlets for the hot and cold waters by axially moving the cylindrical valve body and to reversibly adjust the openings of the inlets for the hot and cold waters by turning the valve body to adjust the mixture amount of the hot and cold waters.

The cylindrical valve body of the conventional switching valve is sealed only by sealing means of O-rings made of rubber or synthetic resin provided at the cylinder side. The O-rings are vigorously worn or damaged by foreign materials such as sand, gravel, rust pieces of pipes mixed in the hot and cold waters to be supplied, and thus has disadvantages that the O-rings early leak the waters.

Calcium, iron, cake and/or a sterilizer such as a chlorine contained in the water to be supplied are adhered to the O-rings to early deteriorate the O-rings, to increase the sliding resistance of the O-rings with the valve body, and the switching valve thus has disadvantages that much greater strength than that at the initial time is required to operate the switching valve.

Even if the sliding surface of the valve body of the switching valve is coated with a lubricant to reduce the sliding resistance of the O-rings with the valve body, the cylindrical valve body is axially moved to open or close the inlets for the hot and cold waters and is rotatably adjusted in the openings of the inlets for the hot and cold waters. Thus, the sliding surface of the valve body contacted with the hot and cold waters is extended in a wide range, and the lubricant coated on the sliding surface is immediately flushed away so that it is very difficult to maintain the initial sliding state on the sliding surface.

A conventional switching valve, wherein a cylindrical valve body and a cylinder are formed of a stainless steel or a ceramic material having less chemical change, less wear and high hardness to enhance the strengths of the valve body and the cylinder has been proposed, but it is difficult to precisely finish the cylindrical shape with the high hardness material. Even if the cylindrical valve body and the cylinder are formed of the high hardness materials, the sealing with the O-rings is still indispensable.

SUMMARY OF THE INVENTION

In view of the foregoing, one object of the present invention is to eliminate the disadvantages of the conventional switching valve and to provide a single cylinder type switching valve for mixing hot and cold waters, wherein inlets for hot and cold waters are planely sealed by smooth surfaces of smooth guide sliding surface formed inside a cylinder and smooth sliding surface of the switching valve to eliminate the use of O-rings to be readily damaged to improve the enduring lifetime.

Another object of the present invention is to provide a single cylinder type switching valve for mixing hot and cold waters, wherein inlets for hot and cold waters are planely sealed by smooth surfaces of smooth guide sliding surface formed inside a cylinder and smooth sliding surface of the switching valve so that the smooth sliding surface of the switching valve and the smooth guide sliding surface formed inside the cylinder are readily formed of a material having less chemical change, less wear, inorganic high hardness such as, for example, special steel, stainless steel, ceramic, or new ceramic to be easily finished to provide excellent sealing effect in the switching valve and to improve the enduring lifetime.

Yet another object of the present invention is to provide a single cylinder type switching valve for mixing hot and cold waters, wherein a switching valve for opening or closing inlets for the hot and cold waters and a mixture valve for adjusting the inlets for the hot and cold waters in the opening are separately formed to operate to feed or stop the inlets for the hot and cold waters in a very small range of reciprocating along the axial direction of the cylinder to thereby reduce the flushing amount of lubricant coated on the sliding surface of the switching valve, to thus maintain the sliding resistance reducing state with the coated lubricant, thereby suppressing the wear on the sliding surface for a long period or time.

Still another object of the present invention is to provide a single cylinder type switching valve for mixing hot and cold waters, wherein a mixture valve for adjusting the inlets for the hot and cold waters in the opening is contained in the switching valve to have a simple structure that does not need a sufficient sealing mechanism in the mixture valve.

These and other objects as may become apparent hereinafter have been attained by a single cylinder type switching valve for mixing hot and cold waters comprising a cylinder opened with inlets for hot and cold waters and an outlet for hot and cold mixture water, a smooth guide sliding surface including the openings in the inlets for the hot and cold waters inside the cylinder and formed along the axial direction of the cylinder, a smooth sliding surface opposed to the smooth guide sliding surface formed inside the cylinder, a switching valve opened with switching inlets for the hot and cold waters corresponding to the inlets for the hot and cold waters in the cylinder and slidably provided to the axial direction of the cylinder on the sliding surfaces, and a mixture valve for opening or closing the switching inlets for the hot and cold waters inside the switching valve.

DESCRIPTION OF THE PREFERRED EMBODIMENT

For a better understanding of the invention as well as other objects and further features thereof, preferred embodiments of the invention will be explained with reference to the accompanying drawings in which:

FIGS. 4 to 8 are longitudinal sectional front views of essential portions of the opening adjusting state of the switching inlets for the hot and cold waters of a mixture valve;

Figure 9:
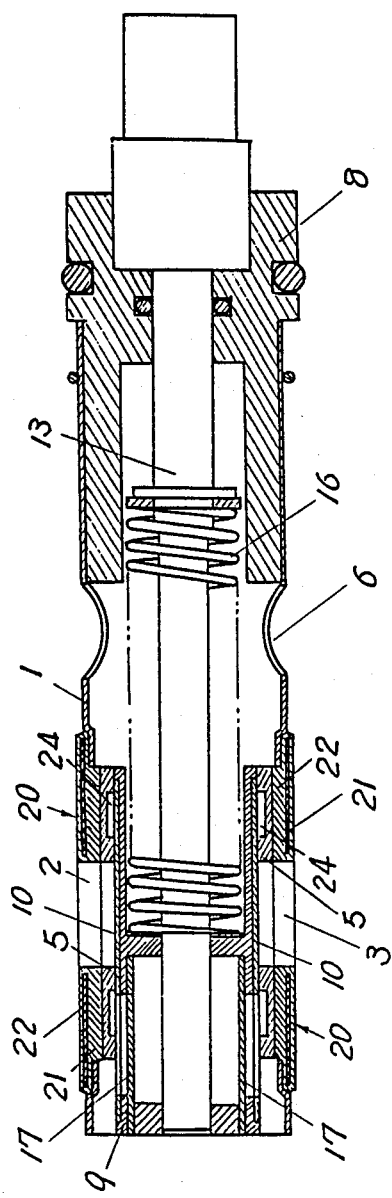
Figure 10:
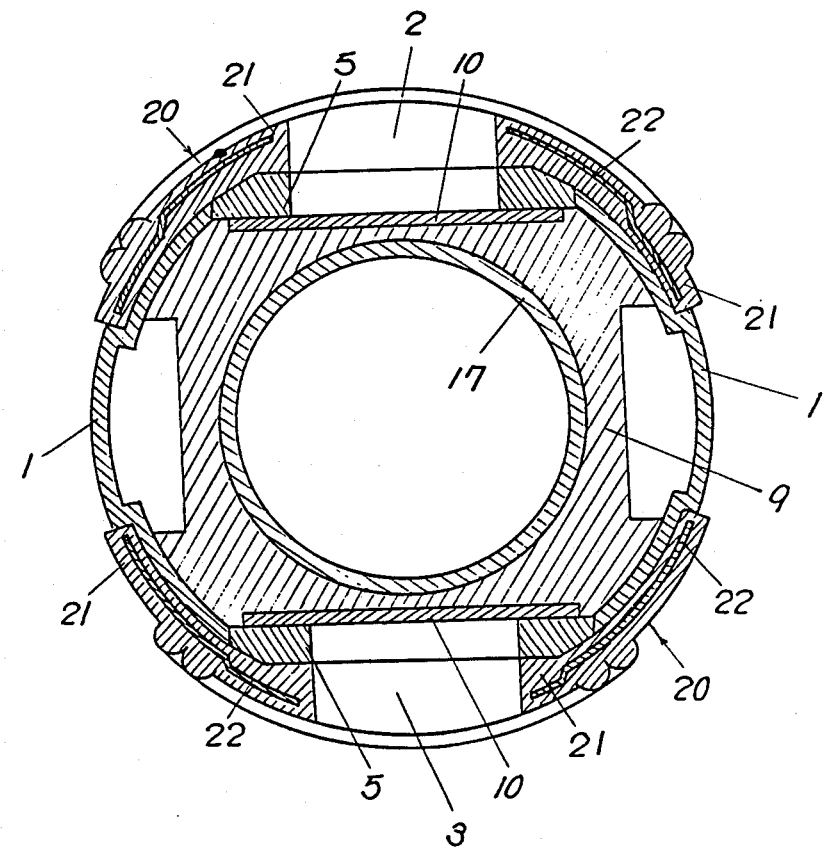
Figure 11:
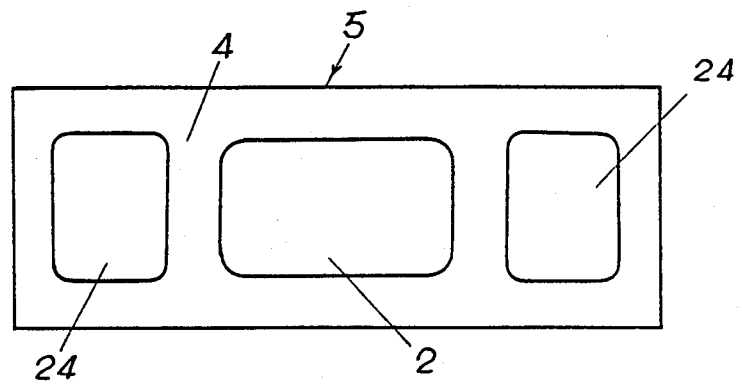
Figure 12:
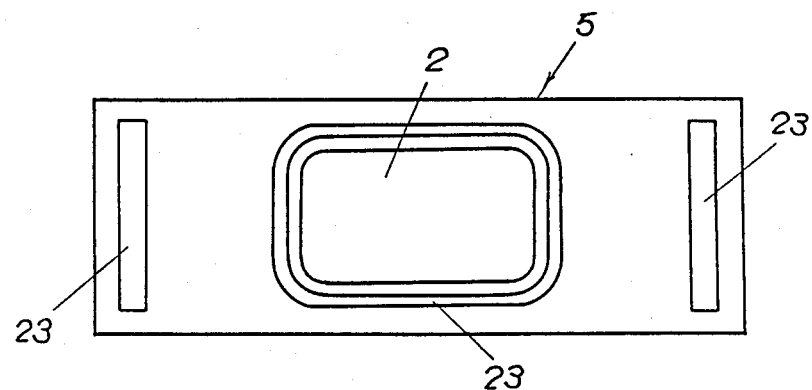
Figure 13:
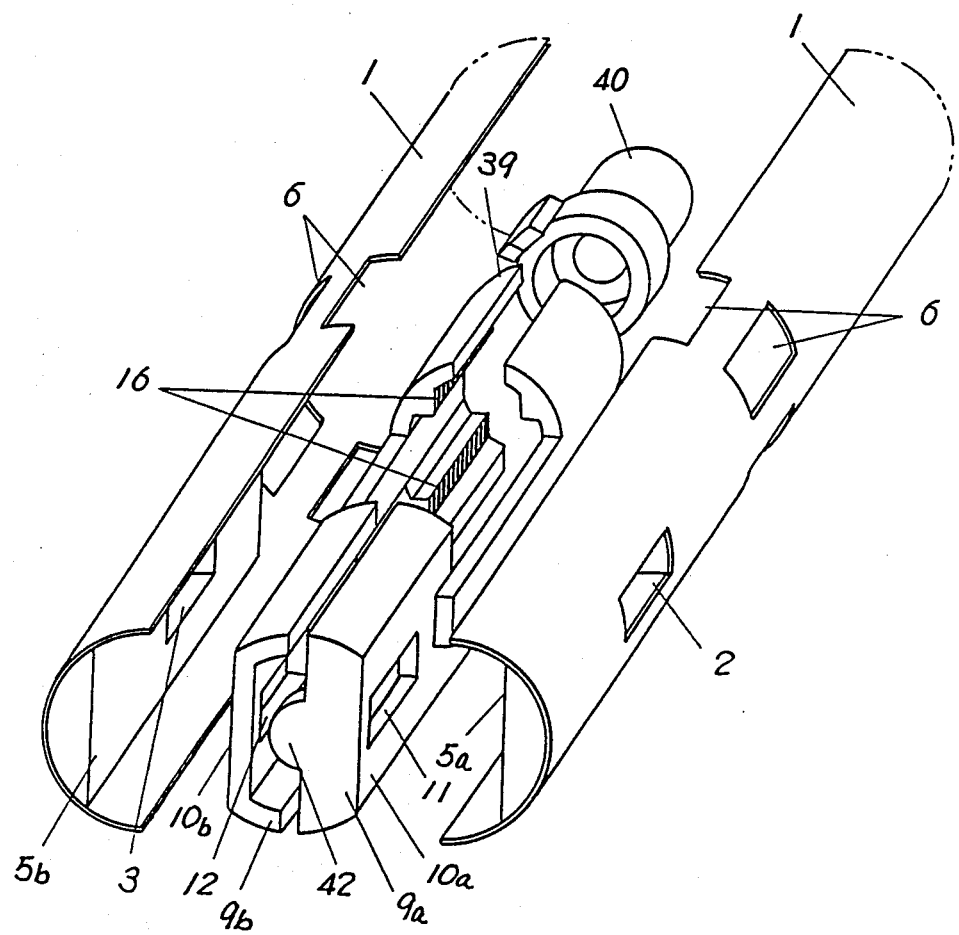
Figure 14:
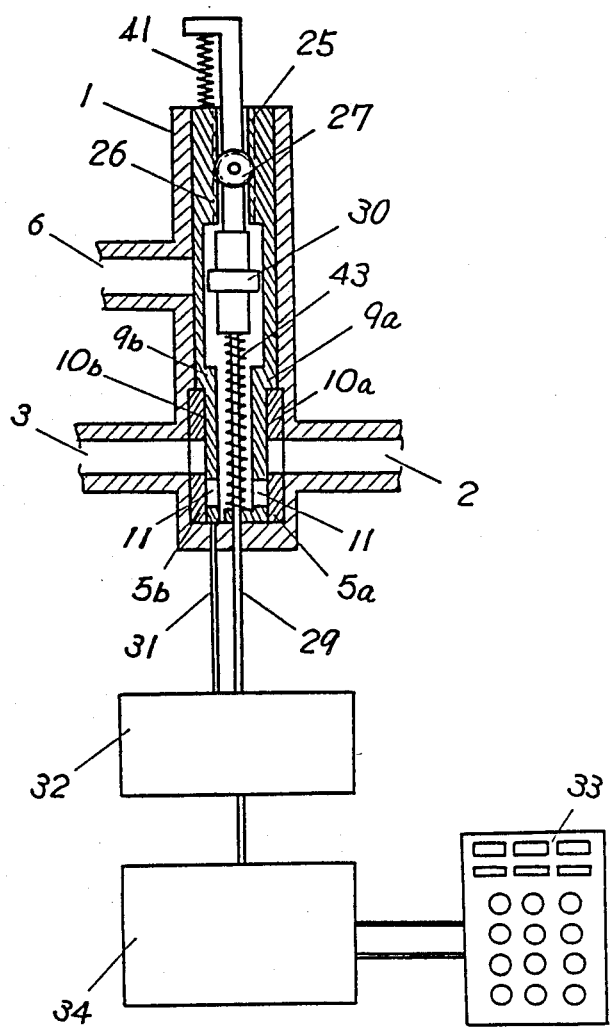
Figure 15:
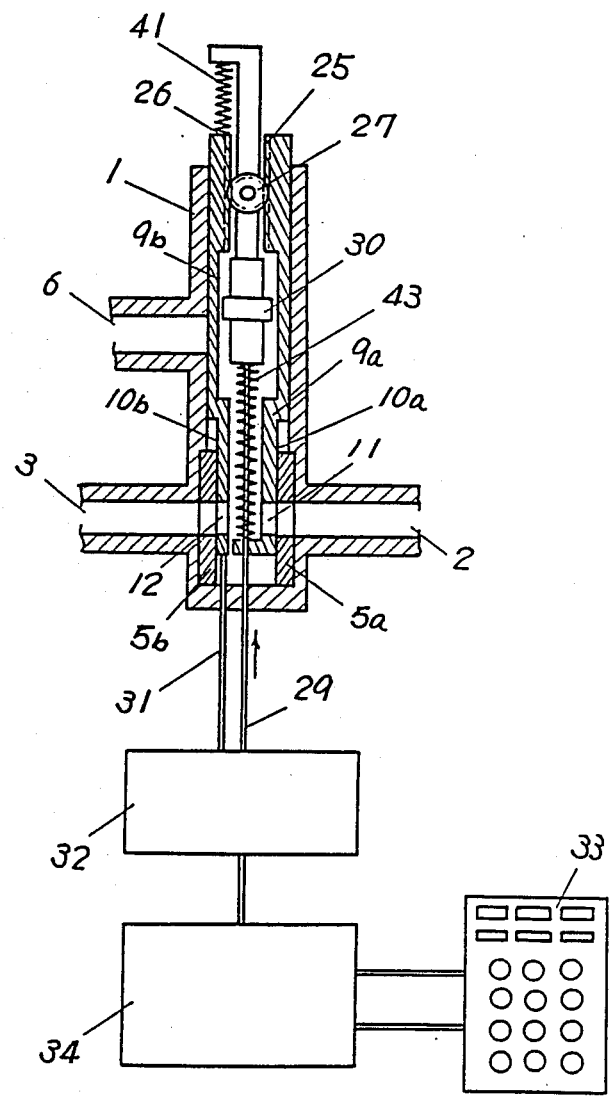
Figure 16:
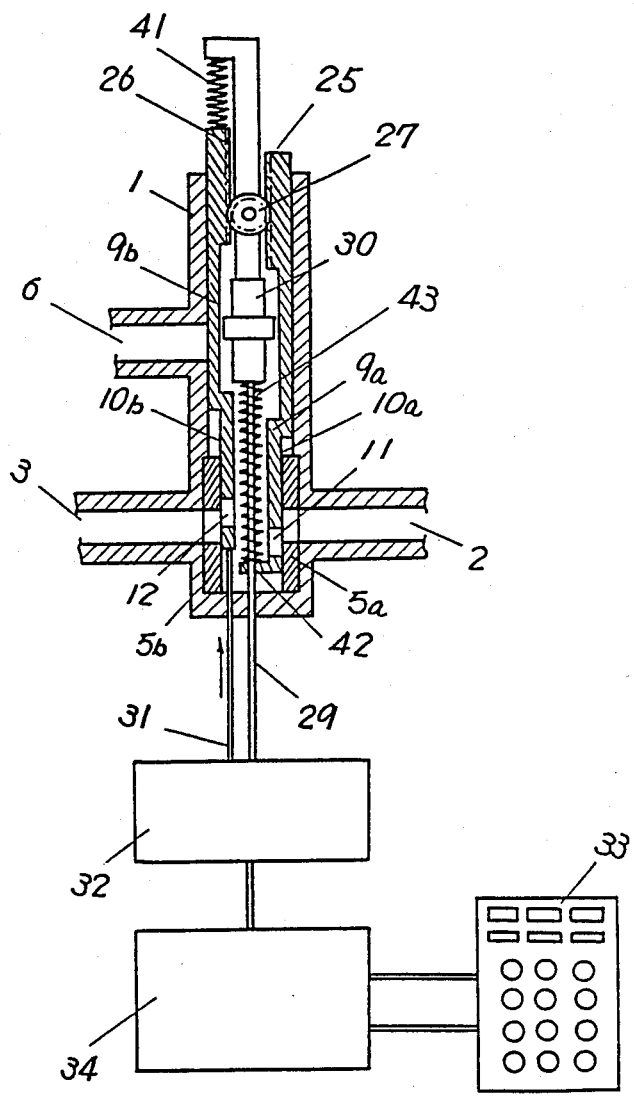
Figure 17:
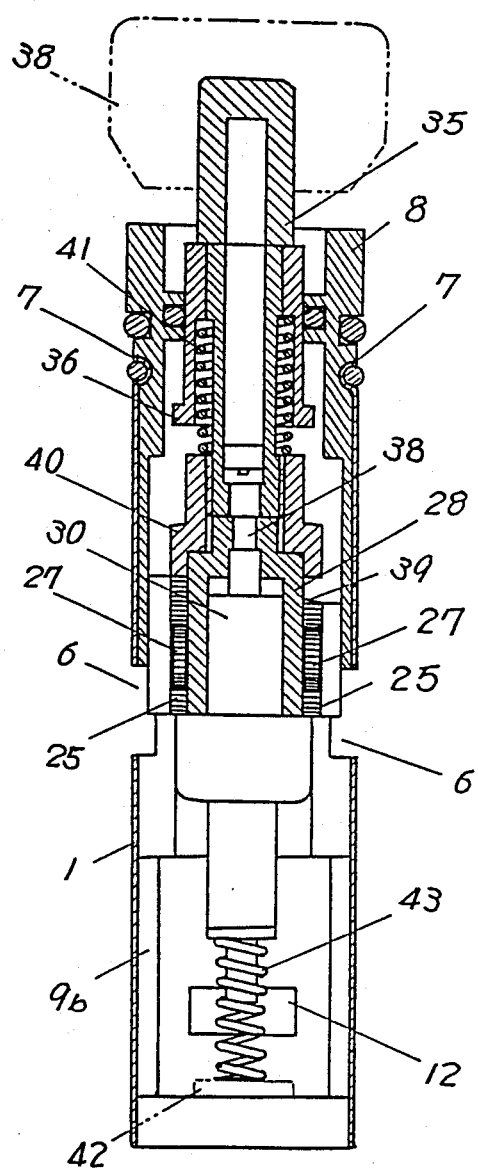
Figure 18:
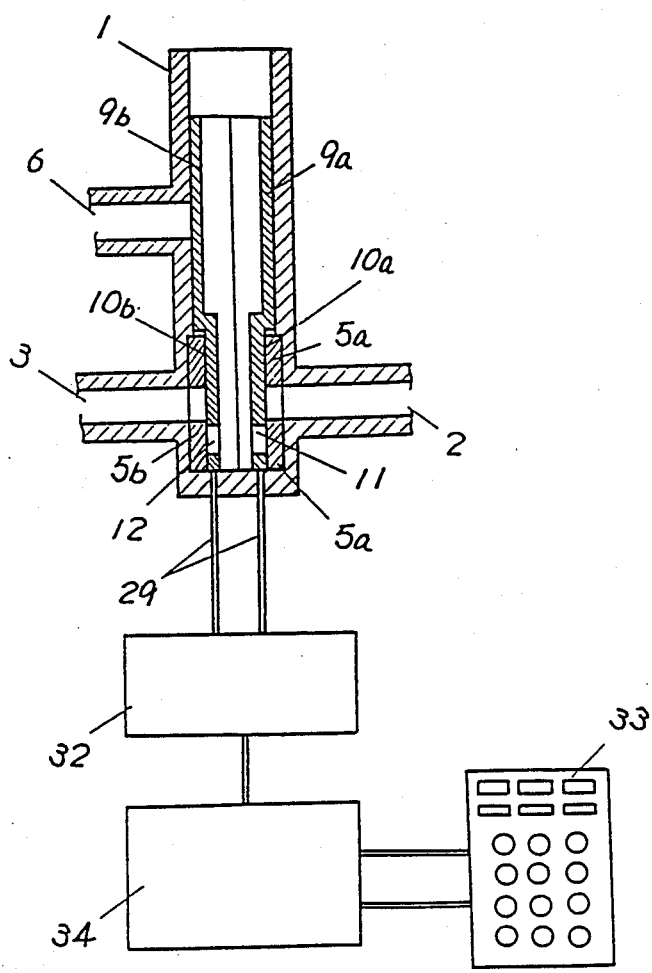

FIGS. 9 to 12 are views exemplifying a watertight structure in the peripheral watertight areas of the inlets for the hot and cold waters of the cylinder, wherein FIG. 9 is a longitudinal side view, FIG. 10 is a longitudinal sectional front view, FIG. 11 is a front view of a smooth guide sliding surface side of a guide plate, and FIG. 12 is a back view of the guide plate; and FIGS. 13 to 18 are views showing an embodiment of the case that the switching valve is divided into hot and cold water side switching valves, wherein FIG. 13 is an exploded perspective view of the essential portion, FIGS. 14 to 16 are longitudinal sectional side views showing the switching states of the inlets for the hot and cold waters, FIG. 14 is the state that the inlets for the hot and cold waters are closed, FIG. 15 is the state that the inlets for the hot and cold waters are opened, FIG. 16 is the state that the openings of the inlets for the hot and cold waters are adjusted, FIG. 17 is a longitudinal sectional side view showing another embodiment, and FIG. 18 is a longitudinal sectional side view of still another embodiment.

Figure 1:
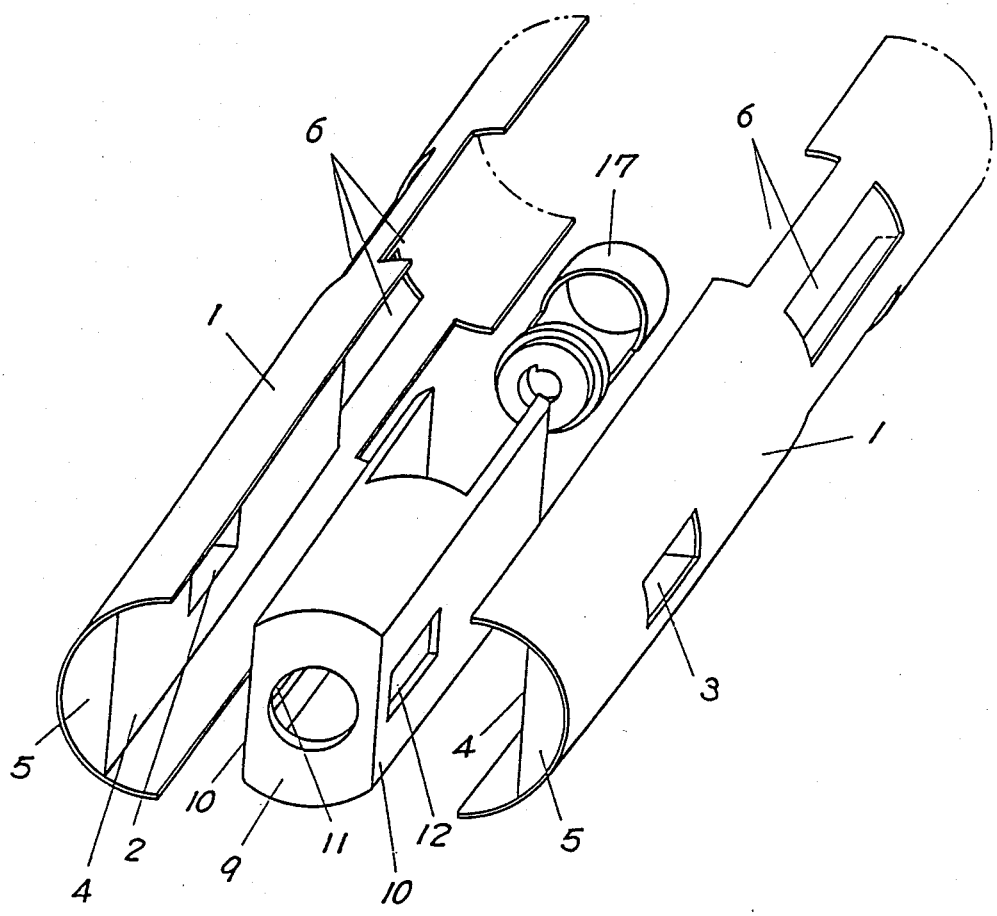
FIG. 1 is an exploded perspective view of an essential portion of a single cylinder type switching valve for mixing hot and cold waters according to the present invention.
Figure 2:
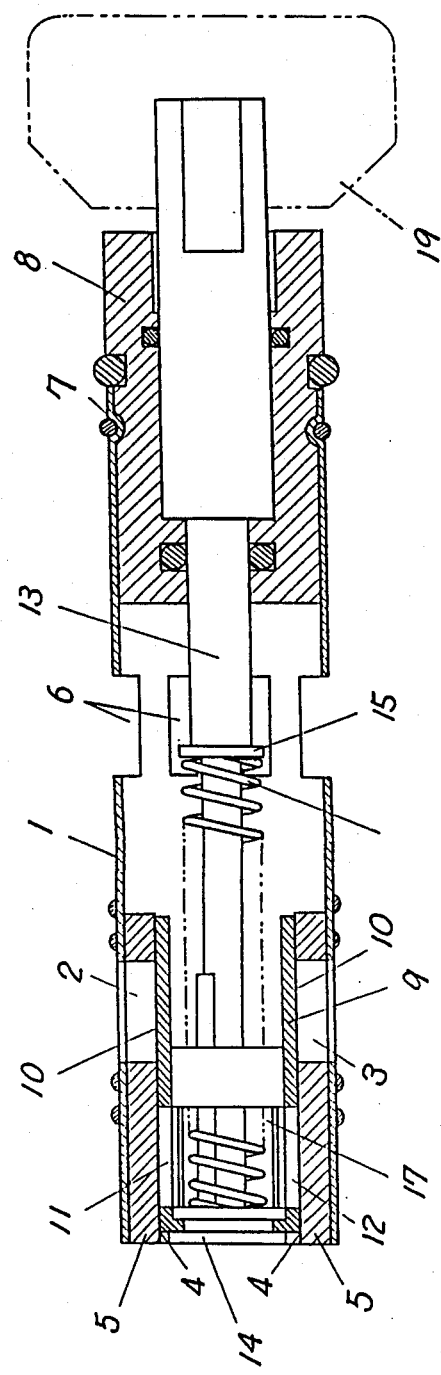
FIG. 2 is a longitudinal sectional side view showing the closed state of inlets for hot and cold waters of the switching valve.
Figure 3:
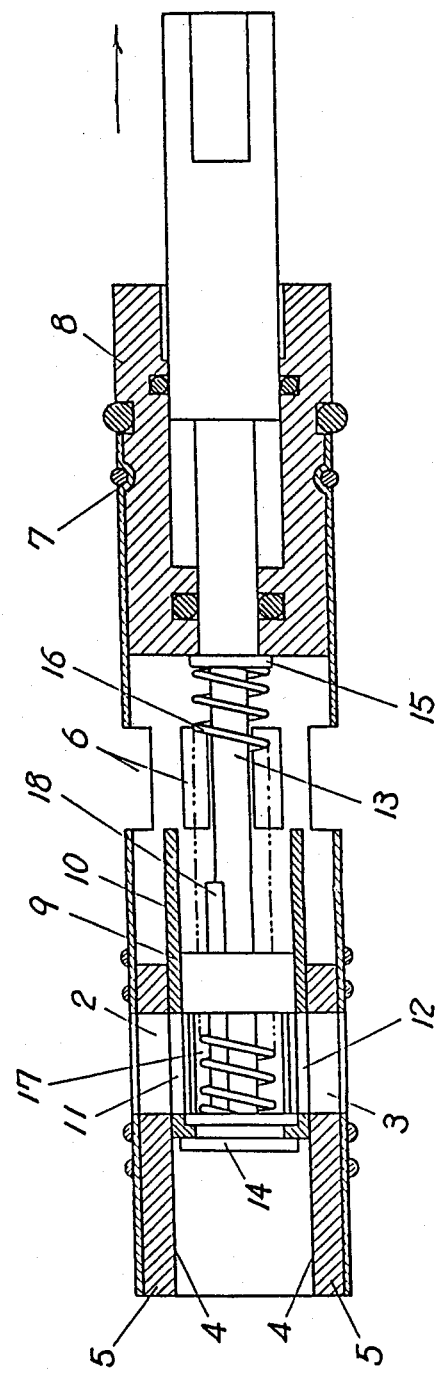
FIG. 3 is a longitudinal sectional side view showing the opened state of inlets for hot and cold waters of the switching valve.

In FIGS. 1 to 3, a cylinder 1 is formed in a cylindrical shape disposed in a mixture cock body and made of metal such as brass or synthetic resin material such as nylon or vinyl chloride. The cylindrical cylinder 1 may be integrally molded, but may be split, molded, and combined. An inlet 2 for supplying hot water is opened at the peripheral edge of one side of the cylinder 1. An inlet 3 for supplying cold water is opened at the peripheral edge of the cylinder 1 radially oppositely to the inlet 2 opened at the peripheral edge of the cylinder 1. The opening positions of the inlets 2 and 3 may not always be accurately opposed, but may be opposed at a proper angle or may be displaced in the axial direction. A smooth guide sliding surface 4 is formed along the axial direction of the cylinder 1 to include the opening of the inlet 2 or 3 inside the cylinder 1, and formed through guide plates 5 and 5. The guide plates 5, 5 may be molded integrally with the cylinder 1, or may be molded separately from the guide plate 5, and the guide plate 5 may be secured by means such as brazing to the inner surface of the cylinder 1. The smooth guide sliding surface 4 for forming its surface is preferably made of a material having less chemical change and less wear such as inorganic high hardness material, for example, special steel, stainless steel, ceramic, or new ceramic material, and it is further effective to mirror-finish the surface to cause a linking phenomenon when the smooth surfaces are superposed. An outlet 6 for hot and cold mixture water is opened at the position opposite axially to the inlets 2, 3 to the cylindrical cylinder 1 for exhausting the hot, cold water supplied into the cylinder 1 or their mixture water. A fixing engaging groove 7 integrally fixes the cylinder 1 to a holder 8 to engage an inner projection with the groove formed on the holder 8 and to engage an O-ring. A switching valve 9 opens or closes the inlets 2 and 3 formed in the cylinder 1, and is formed in a cylinder having smooth sliding surfaces 10 and 10 opposed to the smooth guide sliding surfaces 4 and 4 formed inside the cylinder 1. Switching inlets 11 and 12 for hot and cold waters corresponding to the inlets 2 and 3 formed in the cylinder 1 for the hot and cold waters are opened at the smooth sliding surfaces 10 and 10. A bottom plate is supported by a valve retainer 14 formed at the end of a valve shaft 13 slidably supported to the holder 8, and is held by a collar 15 formed at the intermediate portion of the valve shaft 13 and a spring 16 formed at the inner bottom of the switching valve 9. When the smooth sliding surfaces 10 and 10 of the switching valve 9 move axially of the valve shaft 13 to slide along the smooth guide sliding surfaces 4 and 4 formed on the inner surface of the cylinder 1 to open or close the inlets 2 and 3 of the cylinder 1 in such a manner that the inlet 2 and the switching inlet 11 coincide or displaces from each other and the inlet 3 and the switching inlet 12 coincide or displaces from each other in response to the sliding position. The smooth sliding surfaces 10 and 10 of the switching valve 9 are preferably formed of a material having less chemical change and less wear such as inorganic high hardness material, for example, special steel, stainless steel, ceramic, or new ceramic material, and it is further effective to mirror-finish the surface to cause a linking phenomenon when the smooth guide sliding surfaces 4 and 4 are superposed, similarly to the smooth guide sliding surfaces 4, 4 of the opposed cylinder 1. When the smooth guide sliding surfaces 4, 4 or the smooth sliding surfaces 10, 10 are formed of the high hardness material, the high hardness material may be coated only on the surface portions, the thin plates of the high hardness material may be bonded, or the entire guide plate 5 or switching valve 4 having the guide sliding surfaces 4 and the sliding surface 10 are formed of the high hardness material. A mixture valve 17 is provided to reversibly adjust the openings of the switching inlets 11 and 12 provided in the switching valve 9 to adjust the hot and cold water mixture amount. The mixture valve 17 is composed as a cylindrical valve having a large opening at the side and is disposed in the switching valve 9. The mixture valve 17 is held to the valve shaft 13 by a spring 15 similarly to the switching valve 9, and is integrally turned together with the valve shaft 13 by a key 18 inserted into the valve shaft 13. Since the mounting of the switching valve 9 and the mixture valve 17 on the valve shaft 13 by the spring 16 eliminates the momentary simultaneous closing of both the valves 9 and 17 even if the valves 9 and/or 17 are abruptly closed, but the valves 9 and 17 are moved along the valve shaft 13 against the spring 16, and then gradually closed by the load of the spring 15, thereby preventing a water hammer phenomenon from occurring. The arrangement of the mixture valve 17 is not limited to the exemplified example shown in the drawings, but may employ the mechanism known per se. Further, the mixture valve 17 may employ means such as a method of using a thermostat element or a method of using a thermistor sensor.

The operation of the single cylinder type switching valve of the present invention will be described. The state that the inlets 2 and 3 for the hot and cold waters of the cylinder 1 are closed by the switching valve 9 is first shown in FIG. 2.

In the state shown in FIG. 2, when a handle 19 provided at one end of the valve shaft 13 is pulled rightward of FIG. 3, the switching valve 9 moves rightward through the valve shaft 13 so that the inlets 2 of the cylinder 1 and the switching inlet 11 of the switching valve 9 coincide, and the inlet 3 of the cylinder 1 and the switching inlet 12 of the switching valve 9 coincide to open the inlets 2 and 3, thereby supplying the hot and cold waters from the openings into the switching valve 9.

When the handle 19 is then rotated to turn the mixture valve 17 through the valve shaft 13, the openings of the inlets 11 and 13 of the valves 9 alter as shown in FIGS. 4 to 8. More specifically, in the state of FIG. 4, the inlet 11 is closed, and only the inlet 12 is opened to supply only the cold water. In the state of FIG. 5, the inlet 11 is slightly opened, and the inlet 12 is slightly closed to supply and mix small amount of hot water and large amount of cold water. In the state of FIG. 6, the inlets 11 and 12 are opened similarly to supply and mix the hot and cold waters of the same amount. In the state of FIG. 7, the inlet 11 is slightly closed and the inlet 12 is slightly opened to supply and mix large amount of hot water and small amount of cold water. Further, in the state of FIG. 8, only the inlet 11 is opened, and the inlet 12 is closed to supply only the hot water. The outlet water is exhausted in all the above cases from the outlet 6.

Then, an example of a watertight structure of the watertight areas of the inlets for the hot and cold waters of the cylinder will be described with reference to FIGS. 9 to 12. In FIGS. 9 to 12, a watertight area 20 for opening inlets 2 and 3 for hot and cold waters of a cylinder 1 is split into a packing member 21 made of an elastic material such as rubber or flexible synthetic resin and a guide plate 5 made of a high hardness material such as special steel, stainless steel, ceramic or new ceramic material having a smooth guide sliding surface 4, and is composed by superposing the packing member 21 and the guide plate 5 to be formed as a part of the cylinder 1. The packing member 21 has an outer peripheral surface bent similarly to the cylinder 1 and a watertight ring projected in a semicircular shape to surround the inlets 2 and 3 for the hot and cold waters, and mounts, as required, therein a core material 22 made of a metal plate. This packing member 21 is provided for absorbing the external pressure applied to the watertight area 20. The smooth guide sliding surface 4 of the guide plate 5 is mirror-polished. An engaging projecting strip 23 is provided on the superposing surfaces of the guide plate 5 on the packing member 21, and is provided to surround the inlets 2, 3 at the peripheral edge to thereby engage the guide plate 5 with the packing member 21. A recess 24 is formed on the smooth guide sliding surface 4 of the guide plate 5 contacted with the sliding surface 10 of the switching valve 9 except a portion necessary for holding the watertightness, such as a peripheral edges of the inlets 2, 3 and a portion necessary to slide the switching valve such as both side edges along the axial direction of the cylinder 1. The depth of the recess 24 is of the degree not losing the strength of the guide plate 5, in which range the recess may be formed in a through hole. The recess 24 reduces the contacting area of the smooth sliding surface 4 of the guide plate 5 with the sliding surface 10 of the switching valve 9 to thereby decrease the frictional resistance of the slide contacting surfaces thereof. The recess 24 may be also utilized to contain lubricant such as silicone grease. The lubricant is supplied to the slide contacting surface with the switching valve 9 to readily slide the switching valve 9, and it is effective to utilize the recess 24 disposed at the position not contacted with the hot and cold waters even when the switching valve 9 reciprocates as a lubricant containing chamber.

Another embodiment of the invention in which a switching valve is split into a hot water side switching valve and a cold water side switching valve will be described with reference to FIGS. 13 to 18.

In FIGS. 13 to 18, a hot water side switching valve 9a is provided to open or close an inlet 2 for hot water provided in a cylinder 1, is provided to have a smooth sliding surface 10a opposed to a smooth guide surface of a hot water side guide plate 5a provided inside the cylinder 1, and a switching inlet 11 for hot water corresponding to the inlet 2 provided in the cylinder 1 is opened at the smooth sliding surface 10a. The smooth sliding surface of the hot water side switching valve 9a slides along the smooth guide surface of the hot water side guide plate 5a provided in the cylinder 1 to open or close the inlet 2 of the cylinder 1 in such a manner that the inlet 2 and the switching inlets 11 coincide or displaces from each other, thereby adjusting the opening. A cold water side switching valve 9b is provided to open or close an inlet 3 provided in the cylinder 1, is provided to have a smooth sliding surface 10b opposed to the smooth guide surface of the colt water side guide plate 5b provided in the cylinder 1 to open the switching inlet 12 corresponding to the inlet 3 provided in the cylinder 1. The smooth sliding surface 10b of the cold water side switching valve 9b slides along the smooth guide surface of the cold water side guide plate 5b provided in the cylinder 1 to open or close the inlet 3 of the cylinder 1 in such a manner that the inlet 3 and the switching inlet 12 coincide or displaces from each other according to the sliding position to adjust the opening. The smooth sliding surfaces 10a, 10b of the hot and cold water side switching valves 9a, 9b are preferably formed of a material having less chemical change, less wear and inorganic high hardness similarly to the smooth guide surfaces of the guide plates 5a, 5b provided in the cylinder 1, and are mirror-polished to cause a linking phenomenon when the smooth guide surfaces of the guide plates 5a, 5b are superposed.

Since the opening or closing operation and opening adjusting operation of the inlet 2 by the hot water side switching valve 9a and the opening or closing operation and opening adjusting operation of the inlet 3 by the cold water side switching valve 9b are carried out by the planely linear movement of the hot and cold water side switching valves 9a, 9b since the switching valves are formed of smooth sliding surfaces 10a, 10b opposed to the guide plates 5a, 5b for smoothly guiding the hot and cold water side switching valves 9a, 9b, and any means, if linearly moving the switching valves 9a, 9b along the smooth sliding surfaces 10a, 10b, may be employed. For example, there are a method of transmitting a suitable linear reciprocation directly to the valve body, and a method of transmitting the linear reciprocation converted or converting from the rotary motion to the valve body. As the method of transmitting the linear reciprocation directly to the valve body there are, for example, means for mounting a handle, a lever on a valve body to manually or power pull and push them, means for providing a thermostat element and an operating lever relative to the valve body, operating a heater or cooler by a set electronic controller to cause temperature change to elongate or shrink the lever, or means for providing air cylinder or oil cylinder and its lever relative to the valve body and elongating or shrinking the lever by the driving operation. As the method of transmitting the linear reciprocation converted or converting from the rotary motion to the valve body there are, for example, means for engaging or disengaging a threaded rod, means with eccentric cam and operating lever, means by linkage, means by cranking mechanism, means by pinion and rack, and as rotary motion source there are a manual case, and an electric or hydraulic or pneumatic motor. The rotating degree may be adjusted by manually or power operating a handle or a lever matched to a preset scale, and may further be by setting conditions in a microcomputer and adjusting by buttons. A thermistor is provided near the inlets for the hot and cold waters to detect the temperature of the mixture water to operate a controller by the numerical value from the computer, and further a microcomputer is operated to actuate the hot or cold water side switching valve 9a or 9b.

It is general to separately operate the hot and cold water side switching valves 9a and 9b, but the opening of the inlet 3 may be so set as to be decreased by the switching valve 9b when the opening of the inlet 2 is increased by the switching valve 9a and may be so set as to be increased by the switching valve 9b when the opening of the inlet 2 is decreased by the switching valve 9b, i.e., the switching valves 9a and 9b are reversely operated to reversely adjust the openings of the inlets 2 and 3, thereby effectively adjusting the temperature of the hot and cold water mixture. For example, the switching valves 9a and 9b may be reversely operated by the control of a microcomputer. Similar racks are provided inside the switching valves 9a and 9b, and are operated by one pinion simultaneously, thereby reversely operating the switching valves 9a and 9b.

In the embodiment exemplified in the drawings, the switching valve has the rack and the pinion. More particularly, in FIGS. 14 to 17, a rack 25 is provided inside a hot water side switching valve 9a, and a rack 26 is provided inside a cold water side switching valve 9b. The racks 25, 26 have teeth of the same pitch, and are opposed through one pinion 27. The racks 25, 26 and the pinion 27 are arranged at right and left sides, and may also be arranged only at the center. A pinion holder 28 rotatably supports the pinion 27. An opening or closing operating lever 29 is contacted with the pinion holder 28 or a thermostat element 20 supported to the pinion holder 28. When the lever 29 moves upward or downward, pinion 27 moves upward or downward to move upward or downward the switching valves 9a and 9b together through the racks 25, 26 engaged with the pinion 27 to open or close both the inlets 2 and 3. FIG. 14 shows the state that the inlets 2, 3 are closed by the switching valves 9a and 9b, FIG. 15 shows the state that the switching valves 9a and 9b move upward as the lever 29 rises to fully open the inlets 2 and 3. A mixing lever 31 is contacted with the switching valve 9a to move upward or downward the switching valve 9b by the upward or downward movement thereof. When the mixing lever 31 is operated to move upward as shown in FIG. 16 to rise the switching valve 9b, the rack 26 provided in the switching valve 9b rotates the pinion 27 to move downward the rack 25 and hence the switching valve 9a. Accordingly, the inlets 2 and 3 are both opened by half. The openings of the inlets 2, 3 can be reversely adjusted. When the hot and cold waters are fed reversely, similar operation can be obtained. A driver 32 has a driving mechanism for the operating lever 29 and the mixing lever 31 to be controlled by a microcomputer 34 operated on an operation panel 33.

The embodiment in FIG. 17 shows the case that the switching valves 9a and 9b are manually operated. A valve shaft 35 is slidably installed in a holder 8 through a stopper 36. Though a pinion holder 28 is supported to the valve shaft 35, it is clamped by a screw 27 to rotate the valve shaft 35. Therefore, when the valve shaft 35 is pulled or pushed by a handle 38, the pinion holder 28 coupled to the valve shaft 35 moves together to move the switching valves 9a and 9b through the racks 25, 26 engaged with the pinion 27 installed in the pinion holder to open or closes both the inlets 2, 3. A cam 29 is formed as an oblique surface on the end of the switching valve 9b, and is contacted with a cam clutch 40 slidably provided by a spline with the valve shaft 35. A spring 41 is provided between the cam clutch 40 and the stopper 35 provided on the valve shaft 39 to support the cam clutch 40 in contact. When the handle 38 is rotated to rotate together with the cam clutch 40 to move upward the contacting surface along the oblique surface of the cam 39, the cam 39 and hence the switching valve 9b is moved down to reduce the opening (area) of the inlet 3, while the rack 26 provided in the moving switching valve 9b rotates the pinion 27 to move the rack 35 and hence the switching valve 9b reversely to the switching valve 9b against the spring 43 provided between the thermostat element 30 and the spring retainer 42 of the switching valve 9a to increase the opening of the inlet 2, thereby increasing the mixture ratio of the hot water to the hot and cold water mixture. When the handle 38 is rotated reversely to the above-mentioned case to rotate the cam clutch 40 together to move the contacting surface to move down along the oblique surface of the cam 39, the switching valves 9a and 9b move reversely to that described above through the racks 25, 26 and the pinion 27 by the recoiling actions of the spring 41 provided on the back of the cam clutch 40 and the spring 43 compressed between the thermostat element 30 supported to the pinion holder 28 and the end spring retainer 42 of the switching valve 9a to increase the opening of the inlet 3 and to reduce the opening of the inlet 2, thereby reducing the mixture ratio of the hot water in the hot and cold water mixture.

The thermostat element 30 shown in the embodiment described above is provided to correspond to the temperature change of the hot and cold water mixture during use. In other words, when the water temperature rises during use or the pressure of the water supply side decreases so that the temperature of the mixture water rises higher than a set temperature, was in the element 30 is expanded to elongate the element to compress the spring 43 to move the switching valve 9a in a direction for closing the inlet 3, to rotates the pinion 27 by the rack of the switching valve 9a to thereby move the rack 26 and hence the switching valve 9a to open the inlet 3 by the rotation to abruptly lower the temperature of the mixture water, thereby returning the temperature of the mixture water to the initial set temperature.

In FIG. 18, opening or closing operating levers 29, 29 are provided in the switching valves 9a and 9b, respectively to operate the switching valves 9a and 9b separately by the driving mechanisms of the drivers 32 to open or close the inlets 2, 3 and to further adjust the openings.

The single cylinder type switching valve for mixing hot and cold waters according to the present invention is constructed to planely seal the smooth surfaces of the smooth guide surfaces in the cylinder and the smooth sliding surfaces of the switching valves in the inlets for the hot and cold waters. Therefore, O-rings to be readily damaged are eliminated to improve the enduring lifetime of the switching valve.

The single cylinder type switching valve for mixing hot and cold waters according to the present invention further provides advantages that the inlets for hot and cold waters are planely sealed by smooth surfaces of smooth guide sliding surface formed inside the cylinder and smooth sliding surface of the switching valve so that the smooth sliding surface of the switching valve and the smooth guide sliding surface formed inside the cylinder are readily formed of a material having less chemical change, less wear, inorganic high hardness such as, for example, special steel, stainless steel, ceramic, or new ceramic to be easily finished to provide excellent sealing effect in the switching valve and to improve the enduring lifetime.

The single cylinder type switching valve for mixing hot and cold waters according to the present invention provides advantages that the switching valve for opening or closing inlets for the hot and cold waters and the mixture valve for adjusting the inlets for the hot and cold waters in the opening are separately formed to operate to feed or stop the inlets for the hot and cold waters in a very small range of reciprocating along the axial direction of the cylinder to thereby reduce the flushing amount of lubricant coated on the sliding surface of the switching valve, to thus maintain the sliding resistance reducing state with the coated lubricant, thereby suppressing the wear on the sliding surface for a long period or time.

The single cylinder type switching valve for mixing hot and cold waters according to the invention provides advantages that the mixture valve for adjusting the inlets for the hot and cold waters in the opening is contained in the switching valve to have a simple structure that does not need a sufficient sealing mechanism in the mixture valve.

The single cylinder type switching valve for mixing hot and cold waters according to the invention further provides advantages that the watertight area for opening the inlets for the hot and cold waters in the cylinder for forming the valve body is split to the packing member made of the elastic material and the guide plate made of the high hardness material having the smooth guide sliding surface to be superposed, the smooth guide sliding surface of the guide plate is opposed to the smooth sliding surface of the switching valve to be slidably supported to absorb the external pressure applied to the watertight area to the packing member and to disperse the pressure through the support of the packing to the entire cylinder of the valve body to eliminate the transmission of the unnecessary external force to the guide plate side to prevent the contacting pressure of the guide sliding surface of the guide plate with the sliding surface of the switching valve from increasing, thereby readily sliding the switching valve.

The single cylinder type switching valve for mixing hot and cold waters according to the invention further provides advantages that the recesses are formed on the smoothing guide sliding surface of the guide plate contacted with the smooth sliding surface of the switching valve except the portion necessary for holding the watertightness, further a portion necessary to slide the switching valve, thereby remarkably reducing the slide contacting area of the guide sliding surface of the guide plate with the sliding surface of the switching valve to decrease the frictional resistance of the slide contacting surface to readily slide the switching valve.

As mentioned above, the single cylinder type switching valve for mixing hot and cold waters according to the invention further provides advantages that the recess is formed on the smooth guide sliding surface of the guide plate contacted with the smooth sliding surface of the switching valve as a lubricant containing chamber to contain the lubricant, thereby supplying the lubricant sequentially to the slide contacting surface by the reciprocation of the switching valve to readily slide the switching valve.

As described above, the single cylinder type switching valve for mixing cold and hot waters according to the invention further provides advantages that the hot and cold side switching valves are separately provided to feed, stop the hot and cold waters in the inlets by the switching valves and to freely regulate the opening of the inlets for the hot and cold waters.

As many apparently widely different embodiments of this invention may be made without departing from the spirit and scope thereof, it is to be understood that the invention is not limited to the specific embodiments thereof except as defined in the appended claims.

I claim:

1. A single cylinder type switching valve for mixing hot and cold waters, comprising:
    a cylinder opened with inlets for hot and cold waters and an outlet for hot and cold mixture water,
    a smooth guide sliding surface including the openings in the inlets for the hot and cold waters inside the cylinder and formed along the axial direction of the cylinder,
    a smooth sliding surface opposed to the smooth guide sliding surface formed inside the cylinder,
    a switching valve opened with switching inlets for the hot and cold waters corresponding to the inlets for the hot and cold waters in the cylinder and slidably provided to the axial direction of the cylinder on the sliding surfaces, and
    a mixture valve for opening or closing the switching inlets for the hot and cold waters inside the switching valve;
    wherein said switching valves are separately formed at hot and cold water side switching valves.

2. The single cylinder type switching valve in accordance with claim 1, wherein a watertight area for opening the inlets for the hot and cold waters in the cylinder for forming the valve body is split into a packing member made of an elastic material and a guide plate made of a high hardness material having a smooth guide sliding surface to be superposed, the guide sliding surface of the guide plate is slidably arranged oppositely to the smooth sliding surface of the switching valve.

3. The single cylinder type switching valve in accordance with claim 1, wherein recesses are formed on the smooth guide sliding surface of the guide plate contacted with the smooth sliding surface of the switching valve except a portion necessary to maintain its watertightness and further a portion necessary for sliding the switching valve.

4. The single cylinder type switching valve in accordance with claim 1, wherein a recess is formed on the smooth guide sliding surface of the guide plate as a lubricant containing chamber.

5. The single cylinder type switching valve in accordance with claim 1, wherein power sources for separately operating the switching valves are provided.

6. The single cylinder type switching valve in accordance with claim 1, wherein the openings of the inlets for the hot and cold waters are reversely adjusted by an interlocking unit.

7. The single cylinder type switching valve in accordance with claim 1, wherein the smooth sliding surface of said switching valve is formed of a material having high hardness selected from a group consisting of a special steel, stainless steel, ceramic and new ceramic material.

8. The single cylinder type switching valve in accordance with claim 1, wherein the smooth guide sliding surface of said guide plate is formed of a material having high hardness selected from a group consisting of a special steel, stainless steel, ceramic and new ceramic material.

* * * * *